No. 828,902. PATENTED AUG. 21, 1906.
S. L. SAUNDERS.
DOUBLE SIGNAL SPEED WARNING DEVICE.
APPLICATION FILED JULY 28, 1905.

Witnesses:
P. W. Pezzetti
C. E. Wickens

Inventor:
S. L. Saunders
by Wright, Brown, Quinby & May
Attorneys

UNITED STATES PATENT OFFICE.

SAMUEL L. SAUNDERS, OF BOSTON, MASSACHUSETTS, ASSIGNOR, BY DIRECT AND MESNE ASSIGNMENTS, TO GEORGE M. FOSTER, OF BOSTON, MASSACHUSETTS.

DOUBLE-SIGNAL SPEED-WARNING DEVICE.

No. 828,902. Specification of Letters Patent. Patented Aug. 21, 1906.

Application filed July 28, 1905. Serial No. 271,650.

*To all whom it may concern:*

Be it known that I, SAMUEL L. SAUNDERS, of Boston, in the county of Suffolk and State of Massachusetts, have invented certain new and useful Improvements in Double-Signal Speed-Warning Devices, of which the following is a specification.

The object of this invention is to provide a device by which the speed of a moving part of machinery or of an automobile or other vehicle may be at once rendered evident to the eye and also by which an audible signal may be made whenever the speed reaches or exceeds a certain predetermined amount.

A further object is to provide a novel mechanism driven by a moving part of the machine or vehicle and actuable by centrifugal force to show accurately at any time the rate of speed of the vehicle, &c.

To these ends the invention consists in the mechanism and indicating devices hereinafter described and claimed.

Figure 1:
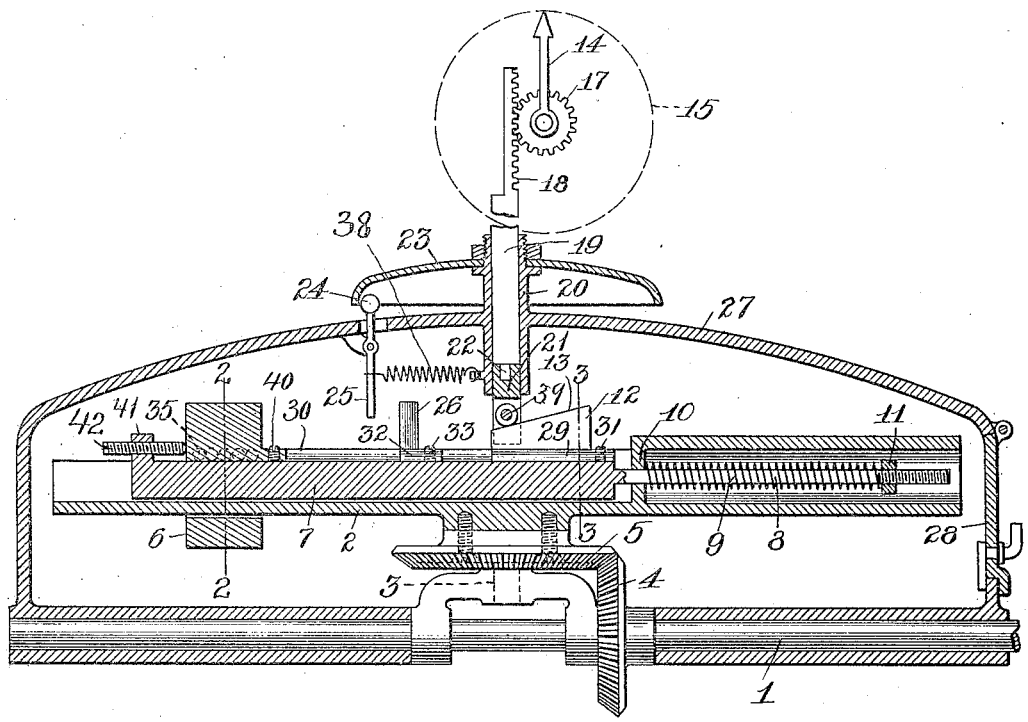
Figure 2:
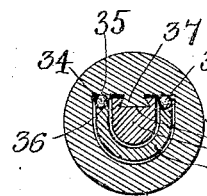
Figures 3, 4, 5:
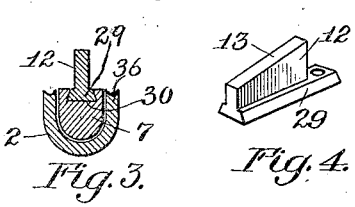
Figure 6:
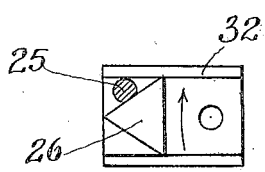

Of the accompanying drawings, Figure 1 represents a sectional elevation of an apparatus embodying my invention. Figs. 2 and 3 represent cross-sectional views taken on lines 2 2 and 3 3, respectively, of Fig. 1. Figs. 4 and 5 represent, respectively, perspective views in detail of elements of the apparatus. Fig. 6 represents a horizontal sectional detail of the bell-striking device.

The same reference characters indicate the same parts in all the figures.

Referring to the drawings, 1 denotes a moving part, which may be the axle or one of the engine-shafts of an automobile, or it may be a shaft of any machine of which the speed is required to be indicated.

2 represents a guideway which is mounted to rotate in a horizontal plane about a vertical axis 3 and is driven from the shaft 1 by any suitable driving connection, such as the bevel-gears 4 5, the former of which is keyed to the shaft while the other is rigidly connected in any suitable manner to the guideway.

Mounted upon the guideway 2, so as to be capable of sliding longitudinally thereon, is a weight 6, which is freely movable and is adapted to be thrown out from the axis of rotation of the guide by centrifugal force. It is rigidly connected to a rod 7, mounted internally in the guide 2 and movable longitudinally thereof. This rod 7 has an extension-rod 8, about which is placed a spring, 9 bearing at one end against an abutment 10 in the guide and at the other end against a nut 11, adjustably mounted in screw-threaded engagement with the rod 8. As will be readily seen, the function of the spring is to draw the weight toward the center of rotation, to hold it at its innermost limit when stationary, and to resist the action of centrifugal force. By adjusting the nut 11 the resistance of the spring may be made greater or less, as desired, so that the amount of motion permitted to the weight 6 for the same variations in speed may be altered, and thus the sensitiveness of the apparatus made of any degree required.

Upon the rod 7 is adjustably and rigidly mounted an upwardly-projecting blade 12, which has a cam-surface 13 for communicating motion from the centrifugally-operated weight to an external visible indicator. This indicator consists of a pointer 14, adjacent a relatively fixed dial 15, which latter is provided with suitable graduations and figures to be read in miles per hour or any other units in which it is required that the speed of the machine should be expressed.

One manner in which the pointer is operated consists of the pinion 17, to which the pointer is attached, and a reciprocating rack 18, attached to a rod 19, which extends partially through a guideway 20, in which it may be suitably held by a feather or a key, so as to be free to move longitudinally therein, but to be prevented from rotating. Its lower end engages with a short section of shafting or rod 21, which bears upon the cam-surface 13 of the member 12. Its lower end is preferably slotted, so as to embrace the sides of the member 12, whereby danger of its displacement is avoided. In order to provide a secure connection between the rods 19 and 21, the former may have a centrally-located reduced cylindrical extension 22, projecting into a socket in the part 21.

The operation of the device will now be readily apparent, and it will be seen that as the guide member 2 is rotated with greater or less speed the weight 6 is impelled more or less from the axis 3, drawing with it the rods 7 and 8 and compressing spring 9. As rod 7 is thus moved, the blade 12 is correspondingly moved, and the cam-surface 13 thereof acts through shaft 21 to reciprocate rod 19, thereby moving the rack and pinion 17 and shifting the pointer 14 proportionally. As the positions which the weight 6 occupies are distant from the axis by amounts proportional to the speed, the pointer is correspondingly actuated to indicate the speed upon the dial. By suitably proportioning the sizes, weights, &c., of the parts and adjusting them properly the pointer may be made to read with great accuracy the exact rate of speed at which the moving part whose speed is to be indicated is traveling.

The indicating device above described gives warning only to the eye of the speed, and in order that an audible warning may be given when the speed attains a certain amount I provide a sounding device, such as a gong 23, and a striking device 24, which has a portion 25 extended into proximity with the mechanism before described. An actuator 26 is mounted upon the rod 7 and is movable therewith so that the circular path in which it travels is determined by the speed of the apparatus. When the speed is great enough, the actuator 26 is moved out where it will engage the member 25 and actuate the latter to strike the gong and produce a sound. Thereby warning may be given when a machine has reached an excessive or dangerous speed, which will attract attention if the dial and pointer are not visible. This device is of especial utility for use with automobile vehicles, and the owners of such vehicles may be compelled by the authorities to place the dial where it will be exposed outwardly, so that a policeman can tell at a glance what the speed of the wagon is and can determine whether the speed regulations are being violated.

The gong-actuator 26 will preferably be arranged to cause the gong to ring when the vehicle is traveling at such an excessively high rate of speed that the position of the indicator 14 on the dial cannot be distinguished, and if the regulation of this device is determined by law the sound alone will show that the speed regulation is violated. The gong will also serve as a warning to pedestrians and other parties on the road, which will be automatically actuated when the speed becomes very great and will give indication of the vehicle's approach and which is independent of voluntary actuation of the warning bell or horn by the driver.

When applied to an automobile, the mechanism will preferably be inclosed in a dust-proof case 27, which may be mounted upon the gear-box of the driving-axle or at any other point which may be convenient. A door 28 provides access to the interior of the casing, so that any of the parts may be adjusted or renewed whenever necessary. When a device of this character is used by police authority, the door will be ordinarily sealed to prevent access by the driver of the carriage and tampering with the adjustment of the indicator.

Further adjustment of the indicator additional to that provided by variations in the tension of the spring may be made by adjustments of the cam projection 12. This cam member is mounted upon a block 29, which has inclined sides and is seated in an undercut dovetail groove 30 in the upper side of the bar 7. A set-screw 31 by pressing against the face of the bar clamps the sides of the block against the inclined sides of the groove 30 and clamps the block in any adjusted position. The bell-actuating projection 26 is also formed upon a similar block 32, which is clamped in the same manner by a set-screw 33, so that it may be adjusted at any point desired along the length of the bar. Thus when this member is set near its outer limit of adjustment it will actuate the bell after only a slight movement of the weight and actuator due to centrifugal force; but when moved inwardly it will not come into position to engage the striker 24 until after a much greater movement away from the axis of rotation, and consequently not until the speed of the vehicle or machine to which the apparatus is applied has become comparatively great. A spring 38 may restore the bell-striker after each actuation thereof.

In order to reduce frictional resistance to movement of the weight, and thereby render the device more sensitive and accurate, I provide an antifriction-bearing for the weight upon the guide member 2, this bearing consisting of a series of steel balls 34, retained in runways 35 and entering grooves 36 in the upper surface of the side members of the guide. There is also a further provision for adjusting the position of the weight on the bar or rod 7, this being additional to the spring 9. A dovetail tongue 37 is formed on the weight in the opening which receives the guide and bar and is so arranged that it will enter the groove 30 when the weight is slipped into place. The tongue extends beyond one end of the weight and has a set-screw 40, which is crowded against the upper surface of the bar and acts to clamp the weight to the bar in the same manner as the members 12 and 26 are clamped. At the end of the bar is a lug 41, in which is threaded an adjustable stop-screw 42, extending toward the weight. This stop-screw limits the outward movement of the weight and obviates any danger of its flying off the end of the rod in case the set-screw 40 should become loosened or the centrifugal force become so great as to overcome the frictional hold which the weight has on the rod. It also serves as a micrometer-adjuster by which the weight may be shifted through small distances and accurately positioned.

It is obvious that the rods 19 and 21 must be placed in line with the axis 3, about which the weight revolves, and consequently a portion of the cam projection which engages rod 21 is in this line. By reason of the construction of the member 21, as previously described, whereby its lower end embraces the cam-blade, it is caused to rotate therewith, and consequently it is constantly rotated while the apparatus is in motion and moved reciprocally only when the rate of speed varies and the weight is thrown out or retracted. Its engagement with the rod 19 is such as to permit rotation relatively to the latter, while only vertical reciprocating motion is communicated. By making the member 19 sufficiently heavy gravity alone will be sufficient to cause this member to lower and carry the pointer back to zero when the cam is retracted; but, if desired, a suitable spring may be provided for lowering member 19 and the rack with greater force. A roll 39 is carried by the member 21 and engages cam 12 to diminish friction between these parts.

In the foregoing specification I have described simply one form in which my invention may be embodied; but it is obvious that many alterations and changes may be made without affecting the scope of the invention. For instance, any other well-known device for striking the bell may be employed for causing the bell to sound, and it is possible to have the bell run electrically, the projection 26 being used to produce a contact which will close an electric circuit. Any device other than a bell for making a sound may be substituted and used equally well. The dial also may be arranged otherwise than as shown, for it may be placed at one side of the axis of the rod 19 and the pointer be suitably geared so as to be operated thereby, and it may be arranged either in a vertical or horizontal plane, suitable and well understood changes in the manner of gearing for operating the pointer being made.

I claim—

1. In a device of the character specified, the combination of a rotary guide member, a weight mounted to slide thereon under the influence of centrifugal force, a projection having a cam-surface connected to the weight, a reciprocatory member engaged with said cam-surface, and an indicator actuated by said reciprocatory member and adapted to be shifted by movement of the weight on the guide member.

2. In a device of the character specified, the combination of a rotary guide member, a weight mounted to slide thereon under the influence of centrifugal force, a projection having a cam-surface connected to the weight, a reciprocatory member, an indicator connected for actuation by said reciprocatory member, and an intermediate connection arranged for reciprocation and rotation in engagement with the reciprocatory member and the cam-surface and adapted to be moved reciprocally by the cam-surface when the latter and the weight are shifted on the guide member.

3. In a device of the character specified, the combination of a rotary guide member, a weight mounted to slide thereon under the influence of centrifugal force, a projection having a cam-surface connected to the weight, a reciprocatory member having a rack connected thereto, and an indicator in geared connection with the rack and arranged to be rotated by movement thereof, the arrangement of parts being such that movement of the weight and cam projection on the guide member will actuate said reciprocatory member and indicator proportionally.

4. In a device of the character specified, the combination of a rotary guide member, a weight mounted to slide thereon under the influence of centrifugal force, a bar or rod connected to said weight, a spring engaged with said rod and with an abutment on the guide member arranged to act in opposition to centrifugal force, an indicator, and a cam mounted on the rod and movable therewith, connected to actuate said indicator.

5. In a device of the character specified, the combination of a rotary guide member, a weight mounted to slide thereon under the influence of centrifugal force, a bar or rod connected to said weight, a spring engaged with said rod and with an abutment on the guide member arranged to act in opposition to centrifugal force, an indicator, a cam mounted on the rod and movable therewith, and a toothed member engaged with the indicator and connected to be actuated by the cam, whereby the indicator is moved proportionately to movements of the weight.

6. A centrifugal speed-warning device consisting of a tubular guide mounted to rotate, a rod or bar mounted for reciprocating therein, a weight connected to the rod and movable outward by centrifugal force, a spring surrounding a portion of the rod and engaging an abutment on the guide, an abutment on the rod engaged by the spring and adjustable to vary the force thereof, the spring being arranged to retract the weight toward the axis of rotation of the guide, an indicator, and actuating connections between the rod and indicator.

7. A centrifugal speed-warning device consisting of a tubular guide mounted to rotate, a rod or bar mounted for reciprocation therein, a weight connected to the rod and movable outward by centrifugal force, a spring engaged with the rod acting to move the weight toward the axis of rotation, a cam projection adjustably attached to the rod, and an indicator connected for actuation by said cam projection.

8. A centrifugal speed-warning device consisting of a tubular guide mounted to rotate, a rod or bar mounted for reciprocating therein, a weight connected to the rod and movable outward by centrifugal force, a spring engaged with the rod acting to move the weight toward the axis of rotation, a cam projection adjustably attached to the rod, a bar engaged with said cam and adapted to be reciprocated thereby, an indicator, and an intermediate toothed connection geared to the indicator and adapted to communicate motion thereto from said bar.

9. A centrifugal speed-warning device consisting of a bar mounted to rotate about a center other than its own axis and guided so as to be movable toward and from its center of rotation, a weight connected to the bar and movable away from the center of rotation by centrifugal force, means for retracting the bar and weight, a bell or gong, and an actuator therefor adjustably carried by the bar and arranged to actuate said bell or gong only when the weight and bar have been projected outward a certain amount.

10. In a device of the character specified, a bar having an undercut channel, a pivot about which the bar is adapted to revolve, the bar being movable by centrifugal force away from such pivot, and an indicator-actuating member located in said channel and constructed to be clamped therein.

11. In a device of the character specified, a bar having an undercut channel, and mounted to rotate about a pivot, being movable by centrifugal force away from such pivot, a plate having a base fitting in said channel and a cam-surface, means for crowding the base of the plate against the walls of the channel to secure the plate therein, and speed-indicating means arranged to be actuated by the cam-surface of said plate as the latter is moved.

12. In a device of the character specified, a bar mounted to rotate and to be moved away from the center of rotation by centrifugal force, a member having a cam-surface connected to the bar adjacent the center of rotation, a rotatable and endwise-movable shaft-section in line with the axis of rotation of the bar and engaged with the cam-surface of said member, and a speed-indicator connected for actuation by endwise movement of said shaft-section.

13. In a device of the character specified, a bar mounted to rotate and to be moved away from the center of rotation by centrifugal force, a plate having a cam-surface connected to the bar adjacent the center of rotation, a rotatable and endwise-movable shaft-section in line with the axis of rotation of the bar slotted to embrace the plate and engage with the cam-surface thereof, and a speed-indicator connected for actuation by endwise movement of said shaft-section.

14. A centrifugal speed-warning device comprising a channeled guide adapted to rotate about a pivot other than its own axis, a bar located and movable endwise in said guide, a weight surrounding the guide and bar and secured to the latter, antifriction-balls between the guide and weight, supporting the weight, and means operated by movement of the bar for indicating speed.

15. A centrifugal speed-warning device comprising a channeled guide adapted to rotate about a pivot other than its own axis, a bar located and movable endwise in said guide, a weight surrounding the guide and bar, a stop adjacent the end of the bar adapted to be engaged by the weight, and speed-indicating means operated by movement of the bar.

In testimony whereof I have affixed my signature in presence of two witnesses.

SAMUEL L. SAUNDERS.

Witnesses:
  A. C. RATIGAN,
  E. T. GRAHAM.